United States Patent [19]
Behr

[11] 3,990,824
[45] Nov. 9, 1976

[54] FILM SIZE CONTROL APPARATUS FOR THE BLOWN FILM PROCESS
[75] Inventor: R. Douglas Behr, Midland, Mich.
[73] Assignee: The Dow Chemical Company, Midland, Mich.
[22] Filed: Apr. 25, 1975
[21] Appl. No.: 571,452

[52] U.S. Cl. .............................. 425/140; 137/83; 264/95; 425/170; 425/172; 425/503
[51] Int. Cl.² .................. B29D 23/00; B29D 23/04; B29D 7/02
[58] Field of Search .......... 425/140, 141, 150, 169, 425/170, 503, 326, 172; 137/83; 264/94, 95, 99

[56] References Cited
UNITED STATES PATENTS
3,460,436  8/1969  Takeda ............................... 137/83
3,700,370  10/1972  Hearns et al. ...................... 425/140

Primary Examiner—Francis S. Husar
Assistant Examiner—R. J. Charvat
Attorney, Agent, or Firm—Burke M. Halldorson

[57] ABSTRACT

Apparatus for regulating the flow of refurbishing gas or air internally to tubular film produced by the blown film process, comprising a pair of opposed arm means or arms adapted to physically contact and sense growth or diminishment in the size of the film, as determined by the spacing between the arms, the arms being independently pivotable preferably about a common axis, or alternately parallel axis closely spaced to approximate a common arc of movement, a gas flow regulating valve comprising a pressurized gas line carried by one arm, at which vicinity it is interrupted to define a gap across which the gas stream flows prior to entering the film, a flow blockage valving means comprising preferably a valve plate fixed to the opposite arm, and having changing position in said gap responsive to relative movement between the arms, the valve plate defining an opening of tapered or variable width, which depending on alignment, partially hindered alignment, or non-alignment with the gas stream, increases or lessens the flow rate as required to maintain a control or predetermined film size.

14 Claims, 4 Drawing Figures

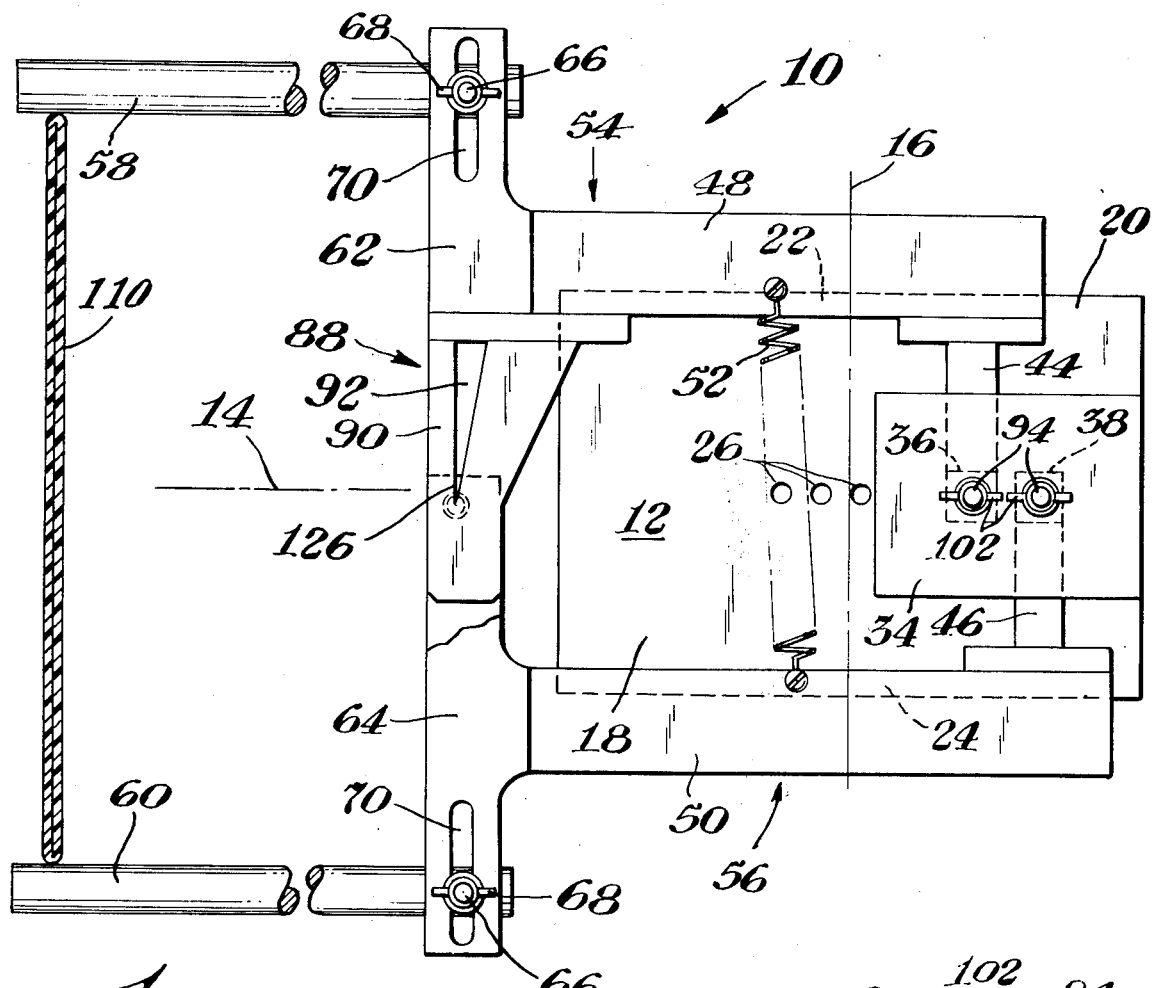
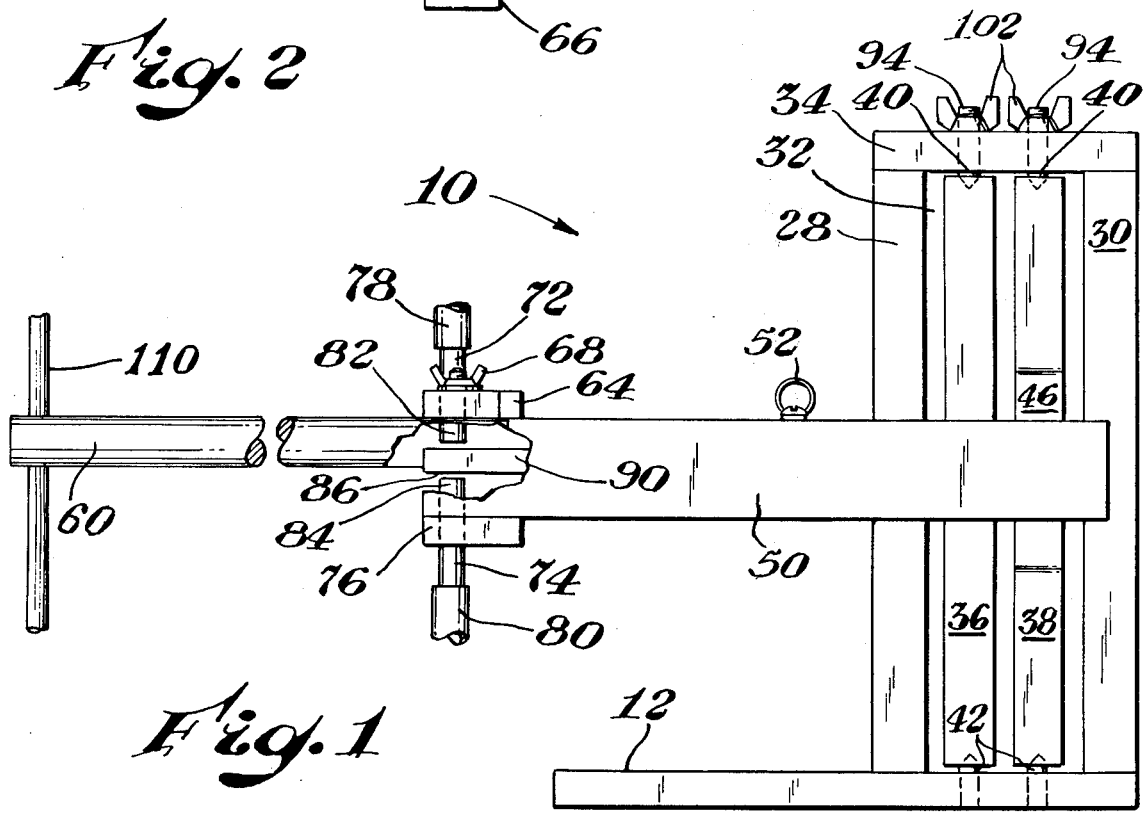

FILM SIZE CONTROL APPARATUS FOR THE BLOWN FILM PROCESS

FIELD OF THE INVENTION

The blown film process as expressed or intended herein, is meant to refer broadly to the manufacture of plastic film (including sheet materials) through extruding a continuous molten tube of a heat plastified resin, stretching or drawing the tube about a trapped air or gas bubble, and cooling the plastic to solidified form, usually with the aid of an external and/or internal cooling means. The invention particularly relates to improved apparatus for use in this process to refurbish gas or air internally to the film, to counterbalance any tendency for growth or diminishment in the size thereof, whereby film (or sheet) of generally uniform size is available from the process.

DISCUSSION OF THE PRIOR ART

Prior art control devices in the field of this invention can provide adequate performance when set properly and given proper operator attention. In order to achieve a good performance level, however, these devices customarily use fairly complex components, such as gear drives, electronic controls, pneumatic or electronic switches, electric motors, electronically operated valves, and the like. As such the devices are oftentimes relatively expensive in initial cost and susceptible, because of their complexity, to malfunctions and resulting production interruptions and losses.

The closest known prior art is represented by U.S. Pat. Nos. 3,649,145 and 3,700,370, which through certain innovations, eliminate some of the complexities normally associated with these devices. For example, U.S. Pat. No. 3,649,145 contemplates a mechanical air regulator valve that is similar in certain respects to the valve intended for this apparatus. However, the valve contemplated in U.S. Pat. No. 3,649,145 is not essentially "frictionless" in the sense intended by this invention; nor is the valve operated and regulated in the same efficient manner as taught herein.

U.S. Pat. No. 3,700,370 also teaches apparatus of this general kind which is somewhat simplified in that the device shown employs mechanical arms in order to sense growth or diminishment in the size of film. The arms through gear connections generate signals, which through potentiometers and further electronic controls, operate an electronically powered air regulator valve. Again, the prior state of such devices, as represented by this patent art, requires relatively complex components susceptible to failure and malfunction.

Accordingly, it is an objective of this invention to provide an improved apparatus for regulating the flow of air internally to tubular film produced by the blown film process, wherein the device is less susceptible to malfunction.

It is a further objective of this invention to provide such a device wherein the initial cost of the same is only a small fraction of the cost of comparable devices of the prior art.

It is still a further objective of this invention to provide such a device wherein the same is delicately sensitive to film size changes, provides good control performance to maintain a desired or control film size, and yet which is essentially entirely mechanical in construction.

BRIEF SUMMARY OF THE INVENTION

Briefly, this invention teaches an improved apparatus or device for regulating the flow of gas internally to tubular film produced by the blown film process, to refurbish and maintain a suitable pressure in the film to stabilize its size. The apparatus comprises a pair of opposed film contact arms, or arm means that read the size of the film, as determined by the spacing between the arms. Most preferably the arms are horizontally positioned, and independently pivotable on low friction bearings about a common axis or alternately, parallel axis, which are sufficiently closely spaced to define a common arc of movement. A pressurized gas line is fixed to and carried by one arm, at which vicinity it is interrupted to define a gap across which the stream flows. The opposite arm supports and carries a flow blockage valving means having changing position in said gap responsive to relative movement between the contact arms. The flow blockage valving means moves in said gap preferably without friction contact with any surface, and includes an opening, preferably of variable or tapered width, which depending on alignment, partially hindered alignment, or non-alignment with the stream, regulates the flow rate to the film. The inventive apparatus particularly combines simplicity of design, with good control performance, and minimal susceptibility to malfunction.

A preferred embodiment of the invention is shown in the accompanying drawings wherein:

FIG. 1 is a side elevational view of apparatus constructed according to the principles of this invention;

FIG. 2 is a plan view of the apparatus of FIG. 1;

DETAILED DESCRIPTION OF THE INVENTION

Figures 3, 4:
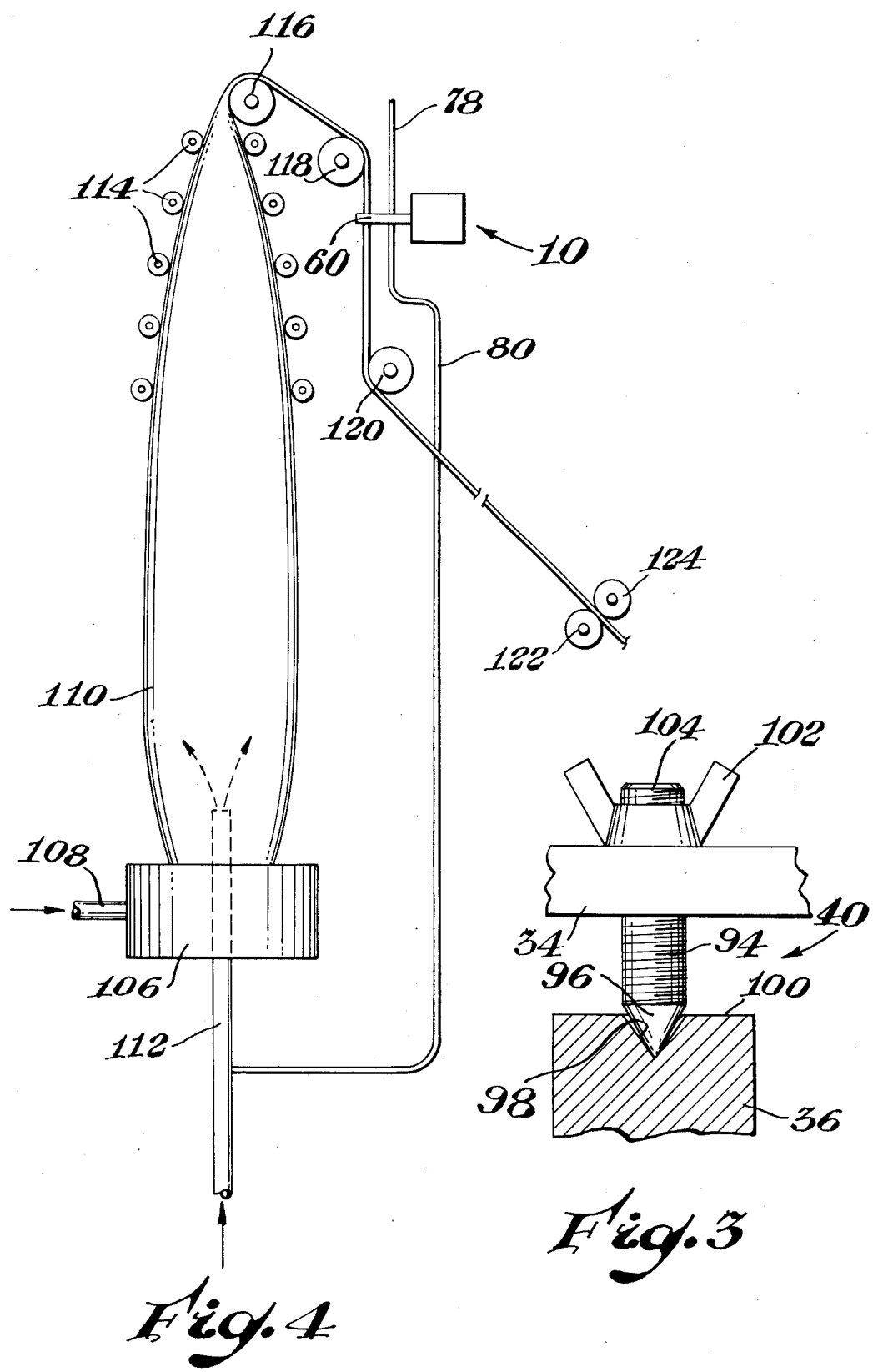
FIG. 3 is a partially enlarged view which better illustrates certain details of the construction of the apparatus of FIGS. 1 and 2.
FIG. 4 is an elevational view showing the apparatus of this invention in combination with a typical blown film process.

Referring to FIGS. 1 and 2, there is shown a gas flow regulating device or apparatus 10, having utility in the "blown film process," in a manner as will be described in some detail hereinafter.

Device 10 comprises a flat, rectangular base plate or base 12, horizontally positioned, and having its major axis 14 extending in the forward to rearward direction, and its minor axis 16 extending in the side-to-side direction. Base 12 defines a forward area 18, a rearward area 20, and side areas 22, 24. The forward area 18 includes drilled openings 26 for mounting the device 10. The rearward area 20 supports a pair of rigid vertical frame plates 28, 30 of equal height, and which are aligned with minor axis 16, and spaced to define a cavity 32. The cavity is open toward each side area 22, 24 of base 12. The vertical plates 28, 30 jointly and rigidly support a horizontal, top frame plate 34 at a raised position above base 12.

A pair of elongated parallel bar members 36, 38 are positioned vertically in cavity 32, with their axis spaced apart in the forward to rearward direction. The bars are freely and independently rotatable, about the vertical axis, by a rotatable connection 40 at their upper ends, respectively, with top frame plate 34; and a like connection 42, at their lower ends, respectively, with base 12. A mounting block 44, 46 is affixed rigidly to each vertical bar 36, 38. The blocks extend outwardly from the opposite, open sides, respectively, of cavity 32. First and second elongated, preferably hollow or lightweight arm sections 48, 50 are affixed rigidly to mounting blocks 44, 46, respectively, and extend generally forwardly and horizontally therefrom. A light spring 52 connects between the arm sections to impart slight inward bias thereto.

Arm sections 48, 50 each comprise the rearward part or portion, respectively, of first and second, horizontal disposed film contact means or arm means or arm assemblies 54, 56. The forward extremity of each arm assembly comprises an elongated rod or rod member 58, 60, respectively, preferably of plastic, and having a smooth surface (appropriate for contact with the film). The rod members are secured in brackets 62, 64, in turn, affixed to forward end of arm sections 48, 50, respectively. Each bracket includes a bolt and wing nut 66, 68, workable in a slotway 70, to permit the spacing between the rod members to be adjusted.

Bracket 64 supports a hollow, cylindrical fitting 72, that is positioned with its axis vertically on the inboard side of arm section 50. A second like fitting 74 is supported in spaced vertical alignment with and underneath fitting 72 by a bracket 76 fastened also to arm section 50. A pressurized flexible air line or hose or gas supply means 78 is attached to fitting 72. A second flexible line or hose or gas receiving means 80 is attached to fitting 74, whereby the terminous end 82 of gas supply means 78, is spaced from the adjacent terminous end 84 of gas receiving means 80, by a gap 86 representing the vertical spacing between fittings 72, 74.

The opposite arm assembly 54 carries a flow blockage valving means or flow blockage valve 88, preferably comprising a valving plate 90 that is rigidly cantilevered off the inboard side of arm section 48, to extend into the area of gap 86, without contact with either terminous end 82, 84. The valving plate defines an opening 92 of tapered or variable width, such as wedge shaped, that has the possibility of alignment, partial hindered alignment, or non-alignment, with terminous ends 82, 84, depending on the spacing between rod members 58, 60.

FIG. 3 is a cut-away view showing a preferred form of the upper rotatable conections 40 (the lower rotatable connections 42 being preferably of generally like design). Connections 40 each comprise a threaded fitting 94 extending vertically through top frame plate 34 and terminating downwardly in a needle point 96 of conical shape. The vertical bars each define a conical depression 98 in the top end surface 100 thereof, which seat the needle points. The needle points have a more severe taper, whereby only a small tip area of the needle point makes a friction generating contact with the surface of the depression. The fittings 94 are threadably adjustable in the vertical direction to make sufficient pressure contact with the vertical bars to prevent wobble, and this adjustment is set through wing nuts 102 received on the upper terminous ends 104, respectively, of fittings 94.

OPERATION

A typical example of the blown film process, in abbreviated form, is shown in FIG. 4. It is understood that this process may, of course, embody a variety of forms so that it is not intended that this part of the disclosure be construed as limiting, but rather as illustrative only.

In reference now particularly to FIG. 4 the process and associated apparatus includes an extrusion die 106 which receives heat plastified resin from a source as indicated generally by conduit 108, and extrudes the resin under pressure upwardly in the form of a continuous molten tube 110. Gas or air is supplied internally to the film through a pipe 112, entering through the central part of the extrusion die, to provide a positive pressure within the film. The tube is solidified usually with the aid of an external and/or internal cooling means (not shown) and at some point upwardly from the extrusion die, is collapsed upon itself such as by means of a suitable collapsing rack 114. The film is then trained about idler rollers 116, 118, 120, and directed to cooperating drive means or drive rolls 122, 124. The rate at which the drive rolls pull the tube, and the positive pressure within the tube, determines its ultimate size.

The position of device 10 with respect to the process is not critical. The arm assemblies operate under sufficiently delicate pressure, such that the device can physically contact and read the diameter of the film, even at regions very near the extrusion die, or the device can be positioned to read the diameter of the tube at the middle or upper areas thereof, if this would be more ideal in a given situation. Device 10 can also be positioned to read the lay flat width of the film, in area where the film is under tension or has at least some tautness. This is the position shown in FIGS. 1, 2, and 4 wherein the device measures the lay flat width of the film as it passes between idler rollers 118 and 120.

In start-up or as a part of installation, the gas receiving line 80 is connected to pipe 112 to feed air or gas internally to the tube. The line pressure in supply line 78 is initially adjusted. Also the spacing between rod members 58, 60 is adjusted such that in the contact position with the film, the tip area 126 of opening 92 of the flow blockage valve is positioned in alignment with the gas flow across gap 86. This tip area is the sensitive portion of the flow blockage valve, and in the stable condition, the valve moves only with slight vacillation from this initial setting. Fine tuning of the line pressure in supply line 78 reduces the vacillation to minimal limits about the sensitive tip area 126.

Any sudden changes in the process, such as might be caused by a pressure loss through pinholes, or other loss of pressure, tends to reduce the size of the film, causing the arm assemblies to close together, thereby moving the valve plate 90 further into gap 86. Consequently a wider part of opening 92 is made available to the gas stream whereby additional air is admitted to the film. Alternatively should the arms move apart (sensing a growth in the size of the film), the flow blockage plate withdraws slightly from the gap, thereby causing greater hindrance to flow, or if conditions are severe, blocks the flow entirely. In this latter condition back flow of the air from the film is also permitted through terminous end 84 of the withdrawal line, to more quickly achieve a return to the stable condition.

Referring now to more general matters, the preferred apparatus has been described with regard to arm assemblages 54, 56 pivotable most ideally about a common axis, or closely spaced axis, adapted to generally approximate a common arc of movement. The degree to which this limitation must be adhered, or alternate solutions provided, depends on the amount of lateral meandering of the tube or film. That is, the arm assemblages, as they are constructed in the preferred embodiment, may shift laterally, and together, without significantly changing the position of the flow blockage plate in the gap, since the arms follow a common or approximately a common arc of movement. This limitation may be more or less strictly observed, of course, depending on a given process, and the tendency or non-tendency for lateral movement of the film in that process.

The device has also been described with respect to the flow blockage valve that is suspended in the gap such as to be free of friction inducing contact with other parts of the device. It has also been described with regard to simplified, yet very low friction bearings, and preferably lightweight arm components or arm assemblages, which are movable essentially in the horizontal direction.

All these features are combined to provide a control device of very simplified structure, which is entirely mechanical, and yet which responds to even very delicate pressure exerted by the film. Particularly the horizontal construction is desired to avoid excessive gravity induced forces against which the film would have to react to move the arm assemblages. However, it is intended that the term "horizontally disposed arm", or "arms in the horizontal direction," or the like, be construed generally. In actual practice a slight or even greater inclination of the arms may be advantageously used to aid the spring member in defining that amount of inward bias desired between the arms.

Understandably, therefore, some but not necessarily all of the combinations of the various structural aspects of device 10, as described above, need necessarily be employed in order to provide a control apparatus adequate as to a certain process or end use, or a certain positioning of the device in respect to a given process.

Accordingly, it should be apparent that it is intended to limit the scope of this invention to the extent only as is specifically defined in the claims below which are set forth in varying scope.

What is claimed is:

1. Apparatus comprising first and second generally opposed arm means, and means for mounting same for independent pivotal movement, means for supplying pressurized gas and means for receiving same, said supply and receiving means defining adjacent terminous end portions, said terminous end portions being attached to the first arm means and separated by a gap, a flow blockage valving means affixed to the second arm means and having a changing position in said gap responsive to relative movement between the first and second arm means, said flow blockage valving means being adapted to provide a variable blocking effect on the flow of gas across said gap responsive to said changes in position.

2. The apparatus of claim 1 wherein said flow blockage valving means is suspended in said gap for essentially frictionless movement therein.

3. The apparatus of claim 2 wherein surface-to-surface friction generating contact, is limited essentially in the design of said apparatus, to said means pivotally mounting the first and second arm means.

4. The apparatus of claim 3 wherein said first and second arm means are adapted to move pivotally generally without gravity induced hindrance on the freedom of their movement.

5. The apparatus of claim 4 wherein said mounting means provides pivotal movement of said first and second arms generally about the vertical axis.

6. The apparatus of claim 5 wherein the axis of said first and second arm means are positioned to at least generally approximate a common arc of movement.

7. Apparatus for controllably refurbishing air to tubular film or sheet material produced by the blown film process, and comprising: generally opposed first and second, non-motorized arm means, independently movable, and being biased inwardly toward each other, the arm means being adapted to monitor the size of the film by physical contact therewith, as read by changes in the spacing between the arm means, gas supply and receiving means affixed to the first arm means, and separated by a gap, a flow blockage valving means affixed to the second arm means and having changing position in said gap responsive to relative movement between the arm means, said flow blockage valving means being adapted to vary the flow of gas from the gas supply to the gas receiving means responsive to said changes in its position.

8. The apparatus of claim 7 including means mounting said arm means for independent pivotal movement.

9. The apparatus of claim 8 wherein the axis of the first and second arm means are positioned to at least generally approximate a common arc of movement.

10. The apparatus of claim 9 wherein said mounting means comprise pivotable connections, comprising needle points rotatably seated in conical-shaped depressions.

11. The apparatus of claim 9 wherein said flow blockage valving means is suspended in said gap for essentially frictionless movement therein.

12. The apparatus of claim 9 wherein surface-to-surface friction generating contact, is limited essentially in the design of said apparatus, to said means pivotally mounting the first and second arm means.

13. The apparatus of claim 9 wherein said first and second arm means are adapted to move pivotally generally without gravity induced hindrance on the freedom of their movement.

14. The apparatus of claim 13 wherein said mounting means provides pivotal movement of said first and second arms generally about the vertical axis.

* * * * *